March 29, 1960     P. E. KAMPMEIER     2,930,051
AUTOMOBILE SLEEPING AND DRESSING UNIT
Filed Jan. 19, 1956
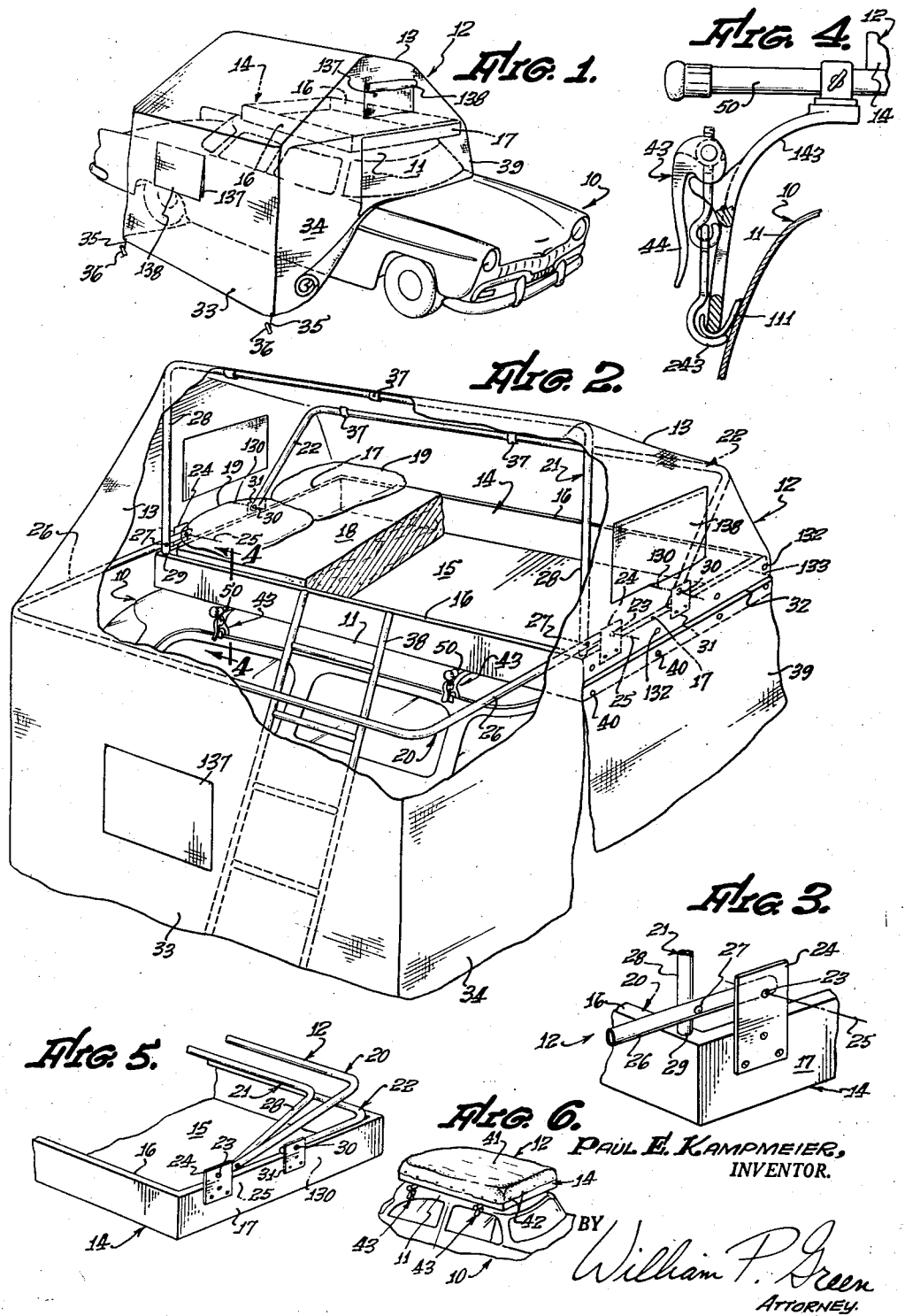
PAUL E. KAMPMEIER,
INVENTOR.
BY William P. Green
ATTORNEY.

2,930,051

AUTOMOBILE SLEEPING AND DRESSING UNIT

Paul E. Kampmeier, La Verne, Calif.

Application January 19, 1956, Serial No. 560,232

3 Claims. (Cl. 5—119)

This invention relates to improved units for providing sleeping quarters for automobile travellers.

A unit embodying the invention is of a type including a bed which is removably mounted to an automobile in a position overlying the roof of the vehicle. A foldable canopy or tent extends upwardly over the bed to form a sleeping enclosure which has the advantages of being elevated above the ground, and of being very easily set up for use because it is left attached to the top of the automobile in both the sleeping and travelling conditions. The elevated bed is made easily accessible to a user by means of a short ladder which can be positioned at a side of the bed.

A major object of the present invention is to provide a sleeping unit of the above type in which the canopy, in addition to enclosing the bed and sleeping area, also encloses a dressing area at a side of the automobile, within which a person may change his clothes prior to climbing upwardly into the bed. For this purpose, the canopy in its opened condition is designed to project laterally beyond the side of the automobile, and to carry flexible side flaps or walls which extend downwardly about and define the dressing area. In collapsed condition, the canopy and its framework fold inwardly to be received adjacent and preferably on the bed, with the entire unit then being enclosable within a covering of suitable flexible sheet material or fabric.

The folding framework for supporting the canopy is desirably so designed as to be openable from collapsed position to a sleeping position by a single opening or unfolding motion. For this reason, the framework may include an essentially U-shaped "bow," which is pivotally attached to the front and rear ends of the bed for swinging movement to a laterally projecting position, in which it extends horizontally outwardly at the side of the automobile. The flaps or flexible walls defining the dressing area may hang from this bow. To collapse the canopy, the bow is merely swung upwardly and inwardly and then downwardly to essentially overlie the bed.

The rest of the canopy may be supported by one and preferably two additional bows, which may automatically swing between open and closed positions in response to movement of the first mentioned side bow. One of these additional bows may be pivotally attached to the first bow, near its opposite ends, and may carry projections adapted to engage the bed in a manner supporting the two connected bows thereon in opened condition. A third bow may be pivoted to the opposite ends of the bed at locations near the center of the transverse extent of the bed.

An additional feature of the invention resides in the provision of a flap or flaps for closing off the view through one or more of the windows of the automobile, to complete the enclosure of the dressing area, and preferably to also enclose the interior of the automobile itself as a portion of the dressing or isolated area. Such a flap may hang downwardly from the bed at locations to close off the front and rear windows, as well as the side windows at the side opposite that at which the dressing area is located. The flap may be removably attached to the bed, as by suitable snaps.

The above and other features and objects of the present invention will be better understood from the following detailed description of the typical embodiment illustrated in the accompanying drawing in which:

Fig. 1 is a perspective view showing an automobile sleeping unit embodying the invention, with the unit being illustrated in the opened condition in which it is used for sleeping;

Fig. 2 is an enlarged perspective view, partially broken away, of the Fig. 1 sleeping unit;

Fig. 3 is an enlarged fragmentary perspective view showing an open condition of a corner of the assembly;

Fig. 4 is an enlarged vertical section taken on line 4—4 of Fig. 2;

Fig. 5 is a fragmentary perspective view showing the manner in which the upper canopy is folded to collapsed or closed condition, and Fig. 6 is a view showing the unit in its completely closed and covered condition for travel.

In the drawings, I have shown at 10 a conventional closed automobile having the usual rigid metal essentially horizontally extending roof 11. The sleeping unit 12 is mounted to the roof 11 of the automobile, and is in the closed condition represented in Fig. 6 when the automobile is traveling. When it is desired to prepare the unit for sleeping, it is opened to the condition shown in Figs. 1 and 2, in which the canopy 13 forms a tent-like covering over a bed 14 which extends horizontally above the roof 11 of the automobile. Canopy 13 also projects laterally beyond the side of the automobile, to enclose a dressing area of substantial size along the side of the automobile.

The frame of bed 14 is rectangular, and may have a horizontal rigid bottom wall 15, typically formed of plywood. Along the opposite sides of frame 14, there may be a pair of spaced parallel upwardly projecting side walls 16, extending longitudinally of the car, with a similar pair of upwardly projecting walls 27 extending transversely across the opposite ends of the bed. Within the recess thus formed by the bed frame, there is positioned a mattress 18, typically an innerspring mattress which may project upwardly several inches beyond the upper edges of frame walls 16 and 17. The pillows 19 and other bedding are of course applied in the usual manner to the bed.

The rigid bed frame 14 is removably rigidly attached to the roof of the automobile, and preferably in spaced relation to the roof as seen best in Fig. 6. For thus attaching the bed frame to the roof, I may use any of various types of brackets, as for instance the type shown at 43 in Fig. 4. Each of these brackets may include a rigid metal element 143 which projects downwardly from bed frame 14 into one of the rain gutters 111 of roof 11; and each bracket may also include a clamping element 243 which is tightenable against the under side of the rain gutter by a swinging cam lever 44. The elements 143 of clamps 43 may be rigidly attached to a plurality of tubular parts 50 which project laterally from and are rigidly attached to the bed frame.

The tent-like canopy 13 is formed of any conventional opaque tent fabric or material, such as canvas, and is supported in the opened condition of Figs. 1 and 2 by means of three U-shaped rigid swinging bows or frame members 20, 21 and 22, which swing between opened and closed positions. The opposite ends of the U-shaped rigid bow 20 are pivotally attached at 23 to a pair of brackets 24 attached stationarily to the bed frame 14. These brackets 24 are preferably connected to the end walls 17 of the frame closely adjacent one side of the frame, and mount bow 20 for swinging movement about a horizontal axis 25 extending longitudinally of the automobile and parallel to the side walls 16 of the bed frame. In the opened position of Fig. 2, bow 20 projects laterally and horizontally a considerable distance beyond the side of the automobile, to define the previously mentioned dressing area adjacent the automobile. The length of the transversely extending parallel arms 26 of bow 20 corresponds approximately to the length of end walls 17 of the bed frame, so that when bow 20 is swung upwardly and then inwardly and downwardly from the Fig. 2 position, bow 20 overlies and rests on the two end walls 17 of the bed frame and the side wall 16 which is located at the side opposite that from which bow 20 projects in the opened position.

The second rigid U-shaped bow 21 has its two parallel arms pivotally attached at 27 near their ends to arms 26 of bow 20 (at locations spaced a short distance from pivotal connections 23). The connections 27 mount bow 21 for swinging movement relative to bow 20 about a longitudinally extending axis parallel to axis 25. In the opened condition of the canopy, bow 21 may extend in a substantially directly vertical plane, and the lowermost ends of the vertically extending arms 28 of bow 21 may project downwardly into engagement at 29 with the side wall 16 of the bed frame. Such engagement of the ends of bow 21 at 29 with the bed frame serves to effectively support bows 20 and 21 in their opened Fig. 2 positions. As seen best in Fig. 5, the two parallel arms 28 of bow 21 are received at the inner sides of the arms 26 of bow 20, so that when these two bows are swung to their collapsed positions overlying the bed, bow 21 is contained within bow 20.

The bow 20 is similar to bow 21, but has its ends pivotally attached at 30 to a pair of brackets 31 attached to bed end walls 17, which brackets may be located at approximately the middle of the transverse extent of the bed. The pivotal connections 30 mount bow 22 for swinging movement about an axis 130 which extends longitudinally of the bed and parallel to axis 25. In its collapsed position of Fig. 5, bow 22 overlies and rests on the upper edges of bed frame walls 16 and 17, and bow 20 directly overlies and rests on bow 22. Preferably the axis 25 of bow 20 is spaced higher than axis 130 of bow 22 a distance equal to the diameter of the tubing from which bow 22 is formed, so that bow 20 lies in a horizontal plane when in its collapsed position of support by bow 22. As will be apparent from the drawing, bow 21 is essentially contained within bow 20 in collapsed position.

The portion of canopy 13 which overlies bed 14 has two end edges 32 which extend along and are removably attached to the outer sides of the two end walls 17 of the bed frame, as by space snaps 132. Along the outer side of one of the walls 16 (the wall 16 which is farther away in Fig. 2), canopy 13 has a side edge 133 which is secured to that side wall 16, as by a series of snaps spaced along edge 133. From this edge 133, the canopy 13 extends upwardly and inwardly over the longitudinal portions of bows 22 and 21, and then continues generally horizontally outwardly about the longitudinal portion of bow 20, from which the canopy material extends downwardly to a location near the earth to form an outer wall 33 of the enclosure. From end edges 32, the canopy material extends essentially vertically upwardly in the vertical plane of the end portions of the bows 20, 21 and 22, to merge with the top wall of the canopy at the bends formed in the bows. These end walls of the canopy also extend laterally outwardly in essentially the same vertical plane, and then extend downwardly from the horizontal arms 26 of bow 20, to form walls 34 defining the ends of the dressing area adjacent the car. These walls or flaps 34, like the outer wall 33, extend to positions closely adjacent but spaced a short distance from the earth (say about six inches above the ground). Walls 33 and 34 may be tied down by suitable ropes 35 attached to the lower ends of these walls at the corners of the enclosure, and connectible to posts 36 driven into the ground. As best seen in Fig. 2, the canopy may be provided with windows 137, preferably screened and having opaque closure flaps 138. It will of course be understood that the fabric or other flexible material forming canopy 13 is suitably secured to the bows 20, 21 and 22 at the points of engagement with the bows, typically by several series of fabric straps 37 (see Fig. 2) which are attached at their opposite ends to the canopy material and extend about the bows.

A user climbs into the bed 14 by means of a short ladder 38, whose lower end may engage the ground and whose upper end may lean against side wall 16 of the bed. This ladder is sufficiently small to be received within the enclosed dressing area formed by walls 33 and 34 at the side of the automobile.

In order to close off the windshield and rear window of the automobile and the windows at the opposite sides, I prefer to employ an opaque elongated flap 39 formed of the same material as the canopy or tent itself, and adapted to be removably attached along its upper edge to the bed frame, typically by a series of snaps represented at 40. This flap 39 may be sufficiently long to extend along the front wall 17 of the bed, as seen in Fig. 2, and to then extend rearwardly along the one of the side walls 16 which is farther away in Fig. 2, and to then finally extend along and be attached to a second end wall 17. From these three walls 16, 17, and 17, the flap 39 hangs downwardly far enough to entirely close off the view through the windshield, rear window, and the outer side windows. Thus, flap 39 forms with the canopy an enclosure which encloses the interior of the automobile as well as the other previously described enclosed areas. When the apparatus is not in use, flap 39 may of course be easily detached from walls 16 and 17, by releasing the snaps 40 which hold the upper edge of flap 39 to these walls. If desired, the portion of flap 39 which is at the side of the car may contain screened windows similar to those shown at 137, for allowing air circulation, and of course adapted to be closed off by suitable opaque flaps such as those shown at 138.

In order to fold the illustrated sleeping apparatus from the Fig. 1 and 2 position to the traveling condition of Fig. 6, the first step is to swing bow 20 upwardly and inwardly and then downwardly from the Fig. 2 position through that of Fig. 5 and until the bows 20, 21 and 22 overlie and are supported on the bed. As bow 20 is swung to its retracted position, the swinging of bows 21 and 22 to their collapsed condition occurs automatically. The fabric of the canopy between the bows of course folds to allow for such collapsing movement. When the bows are in their retracted positions, the end walls or flaps 34 of the canopy may be folded longitudinally inwardly onto the bed, and a short overhanging portion of flap or wall 33 may be folded over the bed if necessary. Flap 39 may be then detached and placed over the folded canopy and ladder 38 may be placed on the bed also. With the entire unit thus in folded condition, an essentially rectangular fabric cover 41 is placed over the entire folded unit. The edges of this cover 41 extend downwardly about the sides of the bed, and carry snaps 42 which are releasably connectable to the side and end walls 16 and 17 of the bed frame about the entire periphery of the bed. Thus, in a matter of a very few minutes, the entire sleeping unit is collapsed to the traveling condition of Fig. 6. To open the unit, the above procedure is of course reversed, and as bow 20 is manually swung upwardly and outwardly to its Fig. 2 position, the canopy and bows 21 and 22 automatically open to their Fig. 2 positions without the necessity for any manual manipulation of these other bows. If it is desired to remove the entire unit from the automobile, brackets 43 allow for such removal by merely swinging cam levers 44 of the brackets to thus loosen the clamping elements 243.

With regard to the proportioning of the parts of the apparatus, it is noted that walls 33 and 34 which define the side dressing area preferably extend downwardly below the level of bed 14 a vertical distance which is greater than the vertical distance from said level of the bed upwardly to the top of canopy 13. This proportioning allows the canopy to most effectively enclose the dressing area which is on a considerably lower level than the elevated bed.

I claim:

1. A sleeper unit adapted to be mounted to a closed automobile having a rigid roof, a door on one side thereof, a windshield, and side and rear windows, said unit comprising a bed, means for mounting said bed to the automobile in essentially horizontal condition above the roof of the automobile, a canopy of flexible sheet material foldable relative to the bed between an open condition and a closed condition for travel, said canopy in open condition forming a tent-like enclosure over said bed and having a portion projecting laterally beyond the one side of the automobile to define the top of a dressing area at the one side of the automobile, side walls of flexible sheet material adapted to depend substantially vertically downwardly from said canopy beneath the level of the automobile roof and of the bed at the one side of the automobile and long enough to reach approximately the ground level when said bed is mounted above the roof of an automobile, said side walls enclosing the dressing area at its front, at its rear, and at an outer side thereof spaced outwardly from the automobile, flap means of flexible sheet material depending downwardly from said bed along the front and back of the automobile and along the side opposite the one side to cover the windshield, the rear window, and the windows at said opposite side in order to close off the interior of the automobile together with the dressing area enclosed by said canopy and walls, and a folding frame connected to said bed for supporting said canopy and said walls in said tent-like open condition and foldable with said canopy between said open and closed conditions, said frame in its open condition projecting laterally beyond the one side of the automobile to support said canopy and said walls, said canopy and frame in closed condition being folded inwardly from the one side of the automobile to collapsed positions overlying the roof adjacent said bed, said canopy in opened condition projecting laterally over the dressing area at a high enough elevation and in such spaced relation to said bed as to allow a person to climb freely into said bed directly from within the enclosed dressing area, whereby the user has ready access from said bed to the side dressing area and through it to the interior of the automobile without leaving the enclosure formed by said canopy and side walls.

2. A sleeper unit adapted to be mounted to a closed automobile having a rigid roof, and a door on one side thereof, said unit comprising a bed, means for mounting said bed to the automobile in essentially horizontal condition above the roof of the automobile, a canopy of flexible sheet material foldable relative to the bed between an open condition and a closed condition for travel, said canopy in open condition forming a tent-like enclosure over said bed and having a portion projecting laterally beyond the one side of the automobile to define the top of a dressing area at the one side of the automobile, side walls of flexible sheet material adapted to depend substantially vertically downwardly from said canopy beneath the level of the automobile roof and of the bed at the one side of the automobile and long enough to reach approximately the ground level when said bed is mounted above the roof of an automobile, said side walls enclosing the dressing area at its front, at its rear, and at an outer side thereof spaced outwardly from the automobile, and a folding frame connected to said bed for supporting said canopy and said walls in said tent-like open condition and foldable with said canopy between said open and closed conditions, said frame in its open condition projecting laterally beyond the one side of the automobile to support said canopy and said walls, said canopy and frame in closed condition being folded inwardly from the one side of the automobile to collapsed positions overlying the roof adjacent said bed, said canopy in opened condition projecting laterally over the dressing area at a high enough elevation and in such spaced relation to said bed as to allow a person to climb freely into said bed directly from within the enclosed dressing area, whereby the user has ready access from said bed to the side dressing area and through it to the interior of the automobile without leaving the enclosure formed by said canopy and side walls, said frame including an essentially U-shaped first bow pivotally attached to said bed at the forward and rear ends thereof and mounted to swing laterally to an open position in which said bow projects laterally outwardly at and beyond the one side of the automobile, and said frame also including a second bow pivotally attached near its opposite ends to said first bow at locations near but spaced from the pivotal axis of said first bow, said second bow having end portions engaging said bed in a relation supporting both bows thereon in the open condition of said canopy.

3. A sleeper unit as recited in claim 2 in which the frame includes a third bow pivoted to the front and rear of said bed at locations near the center of the transverse extent of said bed.

References Cited in the file of this patent

UNITED STATES PATENTS

| 103,611 | Masac | Oct. 25, 1870 |
|---|---|---|
| 492,298 | Johnson | Feb. 21, 1893 |
| 1,229,534 | Shattuck | June 12, 1917 |
| 1,301,619 | Szemanski | Apr. 22, 1919 |
| 1,559,352 | Nelson | Oct. 27, 1925 |
| 1,623,507 | Thurtle | Apr. 5, 1927 |
| 1,764,328 | Magill | June 17, 1930 |
| 2,502,024 | Poche | Mar. 28, 1950 |
| 2,513,411 | Heil | July 4, 1950 |
| 2,571,362 | Hervey | Oct. 16, 1951 |
| 2,627,865 | Mitchell | Feb. 10, 1953 |
| 2,640,999 | Sheppard | June 9, 1953 |
| 2,662,232 | Daly | Dec. 15, 1953 |

FOREIGN PATENTS

| 3,164 | Great Britain | of 1907 |
|---|---|---|
| 344,982 | Italy | Dec. 5, 1936 |
| 360,853 | Great Britain | Nov. 9, 1931 |
| 377,669 | Italy | Jan. 2, 1940 |
| 1,057,013 | France | Oct. 28, 1953 |